United States Patent [19]
Slusher

[11] Patent Number: 5,969,892
[45] Date of Patent: Oct. 19, 1999

[54] MOTION REDUCING FLEXURE STRUCTURE

[75] Inventor: Robert B. Slusher, Westminster, Colo.

[73] Assignee: Ball Aerospace & Technologies Corp., Broomfield, Colo.

[21] Appl. No.: 08/971,399

[22] Filed: Nov. 14, 1997

[51] Int. Cl.[6] .................................................. G02B 7/182
[52] U.S. Cl. .......................... 359/872; 359/872; 248/476
[58] Field of Search ................................. 359/846, 849, 359/872, 900, 224; 248/466, 475.1, 476, 479, 481, 488, 487, 179.1, 178.1, 564, 581

[56] References Cited

U.S. PATENT DOCUMENTS 4,060,315  11/1977  Heinz ....................................... 359/876
5,004,205  4/1991  Brown et al. ........................... 248/476

*Primary Examiner*—Cassandra Spyrou
*Assistant Examiner*—Euncha Cherry
*Attorney, Agent, or Firm*—Sheridan Ross P.C.

[57] ABSTRACT

A flexure/actuator is configured to reliably provide motion reduction, e.g. for positioning or adjusting telescope or other technical or scientific instrument components, preferably at cryogenic as well as higher temperatures. The flexure can be constructed to provide support and strength, preferably in all axes, such as may be needed to withstand launch forces. Preferably flexure axes are defined at upper and lower edges of sidewalls and at intermediate positions of sidewalls. Actuator activation adjusts distance between sidewall intermediate flexures and, by operation of sidewall flexures, adjusts the distance between upper and lower surfaces with a desired reduction ratio.

18 Claims, 9 Drawing Sheets

MOTION REDUCING FLEXURE STRUCTURE

Cross reference is made to U.S. patent application Ser. No. 08/879,740 for a deployable space-based telescope filed Jun. 29, 1997, commonly assigned herewith and incorporated herein by reference.

The present invention is directed to a motion reducing flexure structure of a type usable for making adjustments in technical or scientific instruments including interferometers and space-based or other telescopes.

BACKGROUND OF THE INVENTION

In a number of situations, it is useful to convert the motion of an actuator to a reduced or smaller motion, e.g., to achieve very fine changes or adjustments in position. One area in which such motion reduction may be useful is for adjustment, calibration, pointing, focusing and the like, of various technical or scientific instruments including interferometers and telescopes, particularly space-based telescopes. In the case of telescopes, the fineness or precision with which mirrors, mirror segments or other optical components must be positioned may be substantially finer than the step size with which an actuator, in a particular application, may be moved. Although actuators are of various types and are available with a variety of step sizes or precisions, there are often other constraints limiting the types of actuators available, including constraints on the size, weight, cost, suitable environment, or other performance characteristics of an actuator. According, in many situations, it is desired to use an actuator which has movement components or steps of a given minimum size but to achieve positioning of a telescope mirror segment or other optic with a precision which is finer than that of the actuator. These problems can be particularly acute in the case of a space-based telescope because of the tight constraints which weight and reliability place on actuator components. Accordingly, it would be useful to provide a device for reducing motion of an actuator suitable for technical or scientific instruments, preferably suitable for a space-based telescope or other instruments. Preferably with relatively low weight and size.

Many scientific instruments require operation at low temperatures, such as cryogenic temperatures, e.g., less than about 70 Kelvin. Although motion reduction devices are known, such as reduction gear trains, many such devices are unsuitable for use at low, e.g. cryogenic, temperatures. Among other difficulties, many previous motion reduction devices, such as gear trains, had unsuitable effective thermal conductivities such that temperature differentials between gears or other parts could reduce reliabilty, linearity of performance, or could limit the precision or fineness of adjustment. Accordingly, it would be useful to provide a reduction device which reduces the occurrence of or effect of temperature differentials and preferably which is suitable for operation at low, e.g. cryogenic, temperatures.

Many previous reduction devices included a relatively large number of relatively-moving separate parts (such as parts which are meshed or hinged with one another). Because of the potential for failure of such separate parts, as well as the interference with thermal conduction between separate parts, both of which can be particularly disadvantageous in space-based telescopes or other instruments, it would be advantageous to provide a motion reduction device which reduced or eliminated the need for meshing or hinging of separate parts in at least portions of the motion reduction device.

In some motion reduction devices, the degree of fineness of adjustment is achieved at the price of an unacceptable reduction in the range of motion of the device. In some reduction devices it was difficult or impossible to provide for coarse adjustment in addition to the fine adjustment made possible by the reduction device. Accordingly, it would be useful to provide a reduction device which provides a relatively fine adjustment throughout a relatively large range of motion, preferably with a substantially constant or linear reduction ratio, and/or which allows for coarse adjustment as well as fine adjustment of position.

SUMMARY OF THE INVENTION

According to the present invention, a reduction device provides at least certain motions using flexures. In one embodiment, left and right sidewalls are provided with intermediate flexures allowing them to be configured in a slightly angular or "V" shaped fashion, e.g. by moving the flexures of the left and right sidewalls farther apart or closer together. The upper and lower edges of the left and right side walls are joined, preferably also by flexures, to upper and lower walls which move together or apart as the sidewall intermediate flexures are moved farther apart or closer together. In one embodiment the distance between the sidewall intermediate flexures is adjusted by deflecting a member, such as a plate, rod or bar extending between the left and right intermediate flexures. For example, by coupling the output end of a linear actuator (such as a lead screw-type actuator) to the middle region of the deflectable member, extending the actuator will deflect the mid-portion of the member upward, pulling the end points, and thus the coupled left and right intermediate flexures, closer together. The amount which the upper wall moves (relative to the lower wall) in response to a given movement of the actuator can be configured by selecting or adjusting the angles defined by the intermediate, upper and lower flexures of each sidewall and/or the manner in which the actuator is (directly or indirectly) coupled to the left and right intermediate flexures. Because certain portions are provided with relative movement by flexures (as opposed to, for example, hinges), portions which move relative to one another can be provided as regions of a single integral part, without the need for or use of joints between separate parts. Such a single integral piece is thus more easily maintained at a substantially uniform temperature and the potential for failure of hinges or other couplings between separate parts is reduced or eliminated.

Flexures, as described herein, are believed particularly useful in operation at cryogenic temperatures, especially when formed of suitable cryogenic materials such as titanium alloys, beryllium and the like. The relatively strong flexure structure that can be achieved in this fashion not only provides a component better able to withstand launch acceleration and vibrations or other stresses, but offers a potential for a component which acts both as a support for a mirror (or other optical component) and an actuator (rather than requiring separate actuator and mirror support).

The present invention thus provides a structure which is usable in connection with technical, scientific (e.g. astronomical) or other instrumentation to achieve fine position adjustments in a manner which is practical for space-based telescopes or other technical or scientific instruments.

DETAILED DESCRIPTION OF THE PREFERRED EMBODIMENTS

Figure 1:
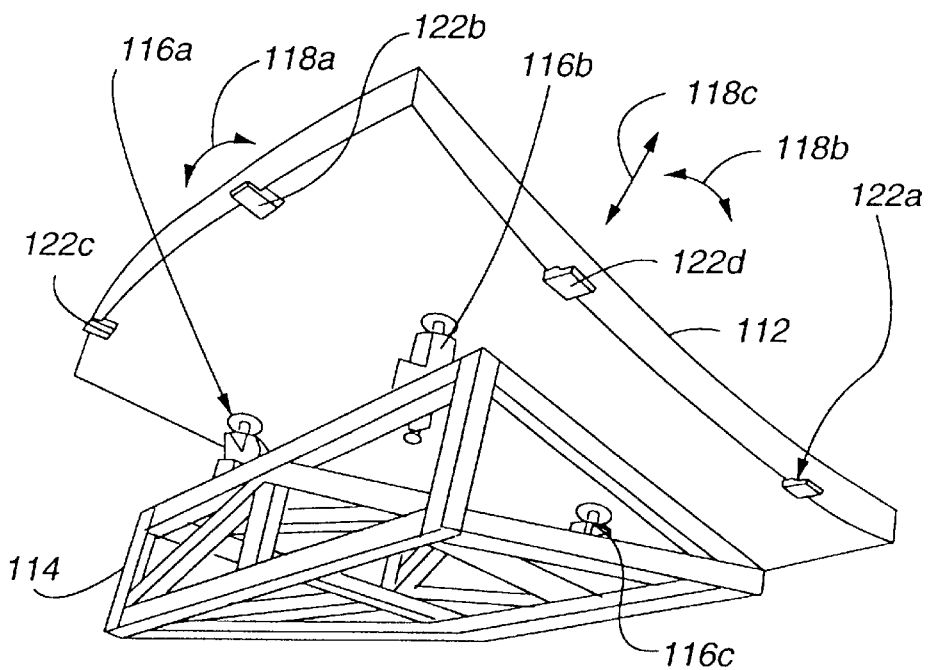
FIG. 1 is a rear perspective view of a mirror segment coupled to a back plane by actuators according to an embodiment of the present invention.

As depicted in FIG. 1, a telescope mirror segment 112 may be coupled to a back plane 114 or similar structure by one or more (as depicted, three) actuator/flexure assemblies 116a, b, c. Such coupling provides for adjustment of position with at least three degrees of freedom, such as tilt 118a, tip 118b and focus (or"piston") 118c motions. In the depicted embodiment, edge sensors 122a, 122b, 122c, 122d provide positional information or feedback for use in adjusting the position of the mirror segment 112. Although the actuator/flexure assemblies of the present invention can be used for positioning mirror segments or other optical electronic or other components in a variety of types of instruments, one use of an actuator flexure of the present invention is in connection with mirror segments for a space-based or earth-orbiting telescope, such as that described, for example, in Ser. No. 08/879,740 (supra). In this application, the actuators would be used to position, with high accuracy, each of a plurality of independently movable primary mirror segments so that the primary mirror is properly aligned and focused with respect to other optical elements (secondary mirror, detectors and the like). In one embodiment, these goals involve providing adjustment with a resolution of about 10 nanometers or less over a range of at least +/−0.1 mm. In one embodiment, the flexure assembly provides a motion reduction ratio (with respect to actuator motion) of at least about 10:1, preferably at least about 12:1 and more preferably at least about 15:1 (i.e., unit movement of the mirror for every 15 units of movement by the actuator). Other resolutions, ranges and reduction ratios for other applications may be achieved by appropriate modifications to the embodiments disclosed herein as will be apparent to those of skill in the art after understanding the present invention.

Figure 2:
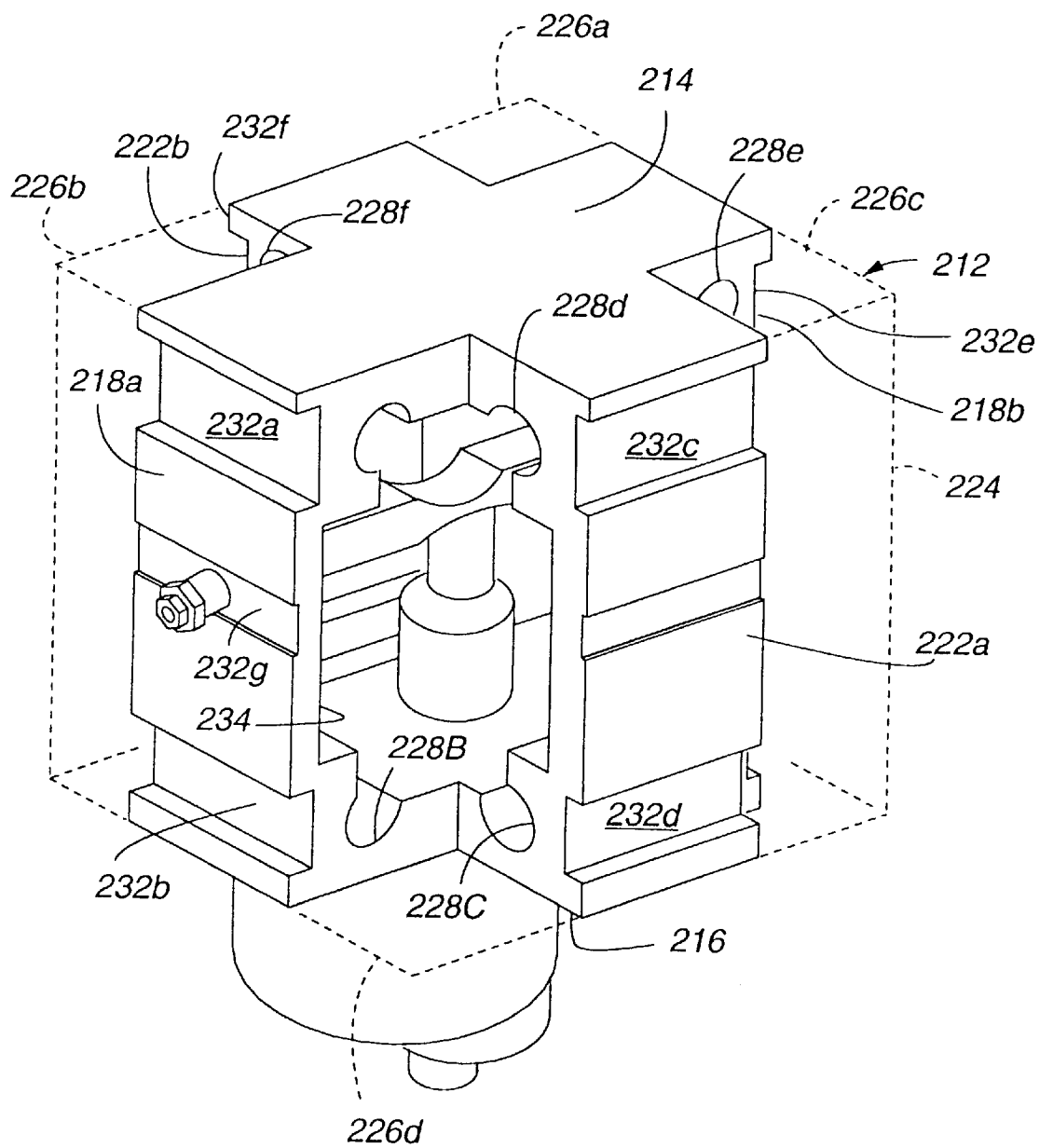
FIG. 2 is a perspective view of a flexure/actuator structure according to an embodiment of the present invention.
Figure 3:
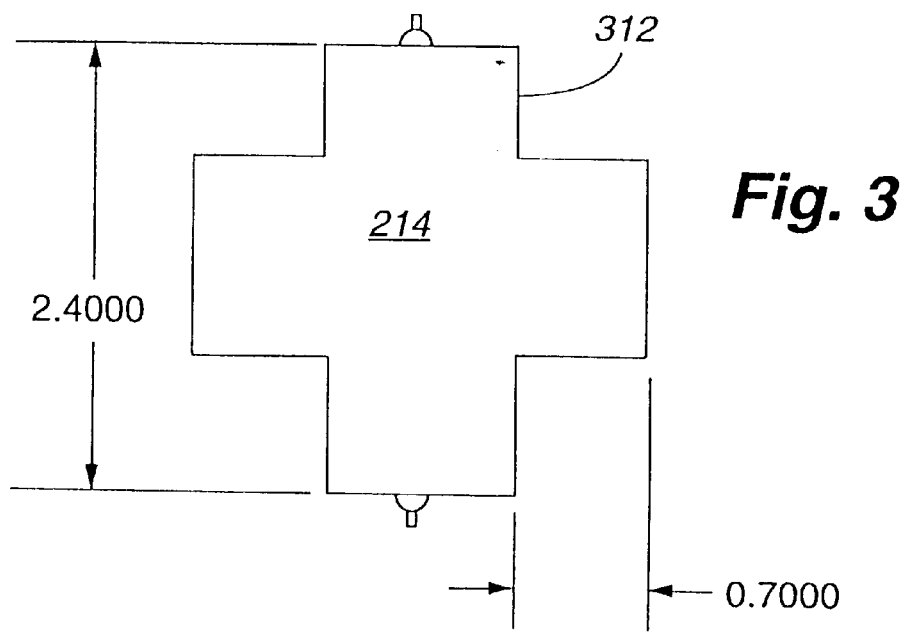
FIG. 3 is a top plan view of an actuator/flexure structure according to an embodiment of the present invention.

FIG. 2 depicts one embodiment of a flexure assembly/actuator assembly. The flexure structure 212 includes an upper wall 214, a lower wall 216, a left sidewall 218a, a right sidewall 218b, a front sidewall 222a, and a rear sidewall 222b. Preferably the flexure structure 212 is formed of a single integral unitary piece substantially without joints between separate pieces or parts, such as may be formed by machining a single block of starting material. For example, starting with a substantially rectilinear starting block 224, corner regions 226a, b, c, d may be removed by machining (e.g. sawing) to form a cruciform cross section (e.g. as depicted in FIG. 3, 312), rounded-profile regions 228a through 228f may be formed by drilling, recess regions 232a–f, 232g may be formed by machining and the interior region 234 maybe formed by machining.

Figure 4:
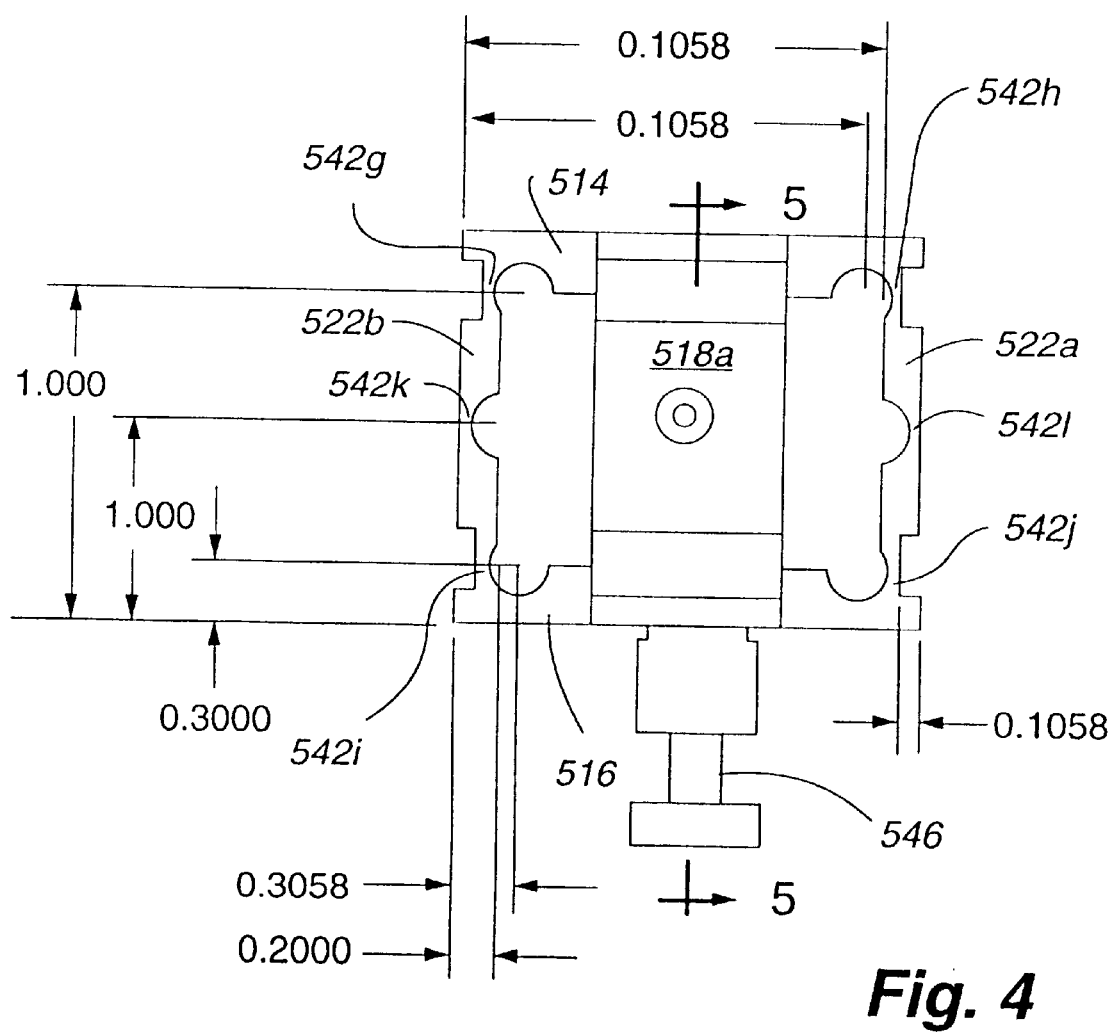
FIG. 4 is a side plan view of the flexure/actuator structure of FIG. 3.
Figure 5:
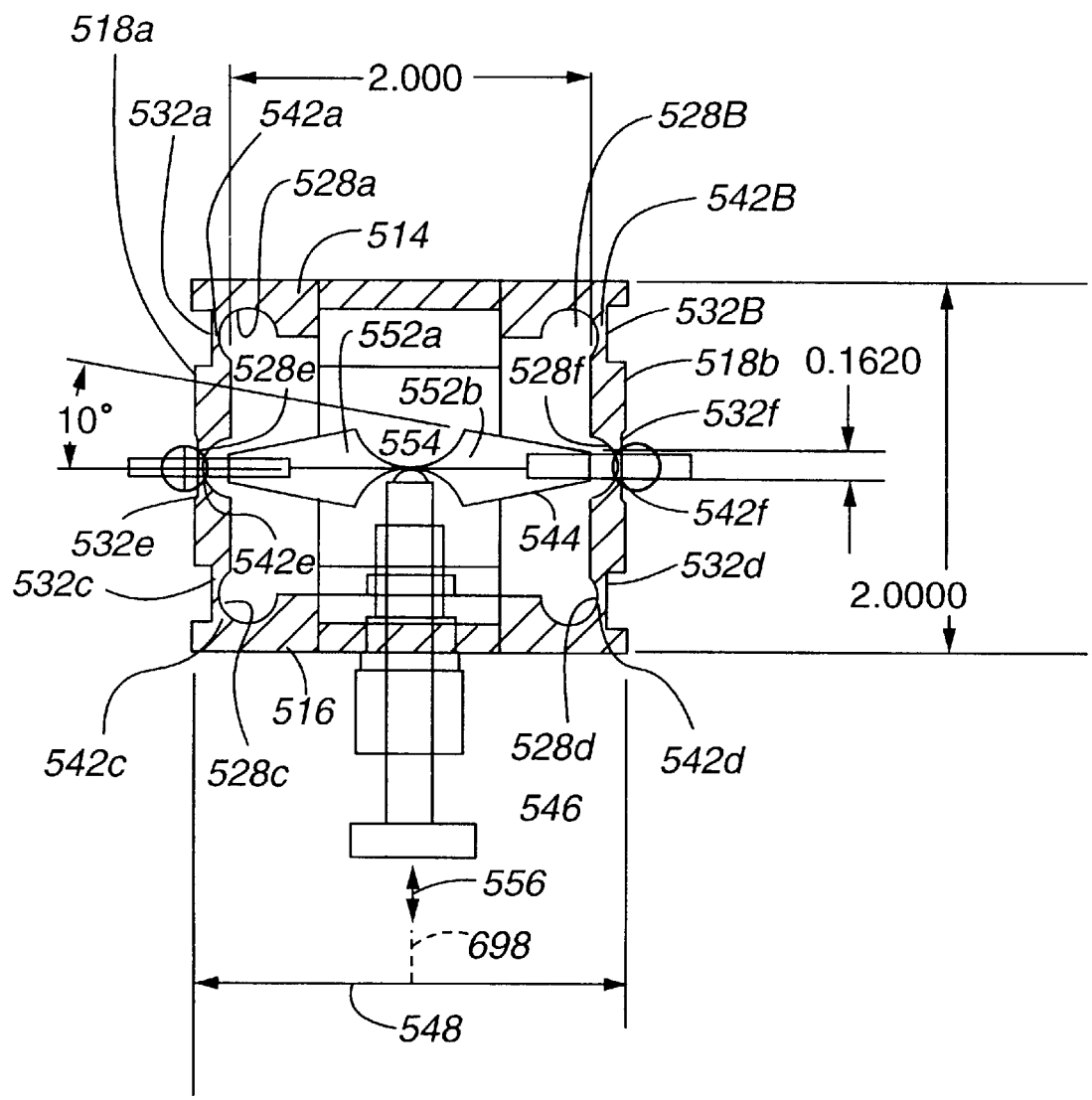
FIG. 5 is a cross-sectional view taken along line 5—5 of FIG. 4.

As seen in FIGS. 4 and 5, in one embodiment, left and right sidewalls 518a, 518b include upper rounded profile regions 528a, 528b and upper recess region 532a, 532b to form upper end regions therebetween defining upper left and right flexure axes 542a, 542b. Lower rounded profiles 528c, 528d and lower recessed regions 532c, 532d provide thinned regions therebetween to define lower flexure axes 542c, 542d. Intermediate rounded profile regions 528e, 528f and recesses 532e, 532f define thinned regions therebetween to define intermediate flexure axes 542e, 542f. The rounded profiles 528 and recesses 532 extend substantially fully across the left and right sidewalls 518a, 518b to define flexure axes 542a, b, d, c, e, f, permitting flexure across the extent of the left and right sidewalls 518a, 518b (axes extending perpendicular to the plane of the paper in the view of FIG. 5). Although left and right sidewalls depicted in FIG. 5 may suffice to achieve the desired motion reduction, preferably front and rear sidewalls 522a, 522b provide additional strength and stability to the structure as well as helping to assure that the upper wall 514 is maintained parallel to the lower wall 516 during use. Maintaining the walls parallel is useful in achieving predictable and reproducible mirror segment movement. Preferably the front and rear walls are provided with rounded profiles and/or recesses to define upper, lower and intermediate flexure axes 542g through 542l in a fashion similar to that described and depicted for the left and right sidewall so that the resultant symmetry assists in maintaining the upper wall 514 parallel to the lower wall 516 as described.

An adjustable, (in the depicted embodiment, deflectable) member 544 is coupled to the intermediate flexures of the left and right walls 542e, 542f such that, in a manner described more fully below, deflection of the member 544 (e.g. in response to linear movement of the actuator 546) affects or adjusts the distance 548 between the left and right sidewall flexure axes 542e, 542f. In the embodiment depicted in FIG. 5, the member 544 includes left and right wing portions 552a, 552b with a thinned portion therebetween 554 so that upon movement 556, e.g. upward movement, of the actuator 546, the central region of the member 544 will be deflected upward. A number of actuators may be used in connection with the present invention. One example of an actuator which may be used, at least at noncryogenic temperatures, are those sold under the trade name"New Focus Picomotor" available from New Focus, Inc., Santa Clara, Calif. Other actuators include magnetostrictive actuators such as those available from Energen and piezoactuators.

Figure 6:
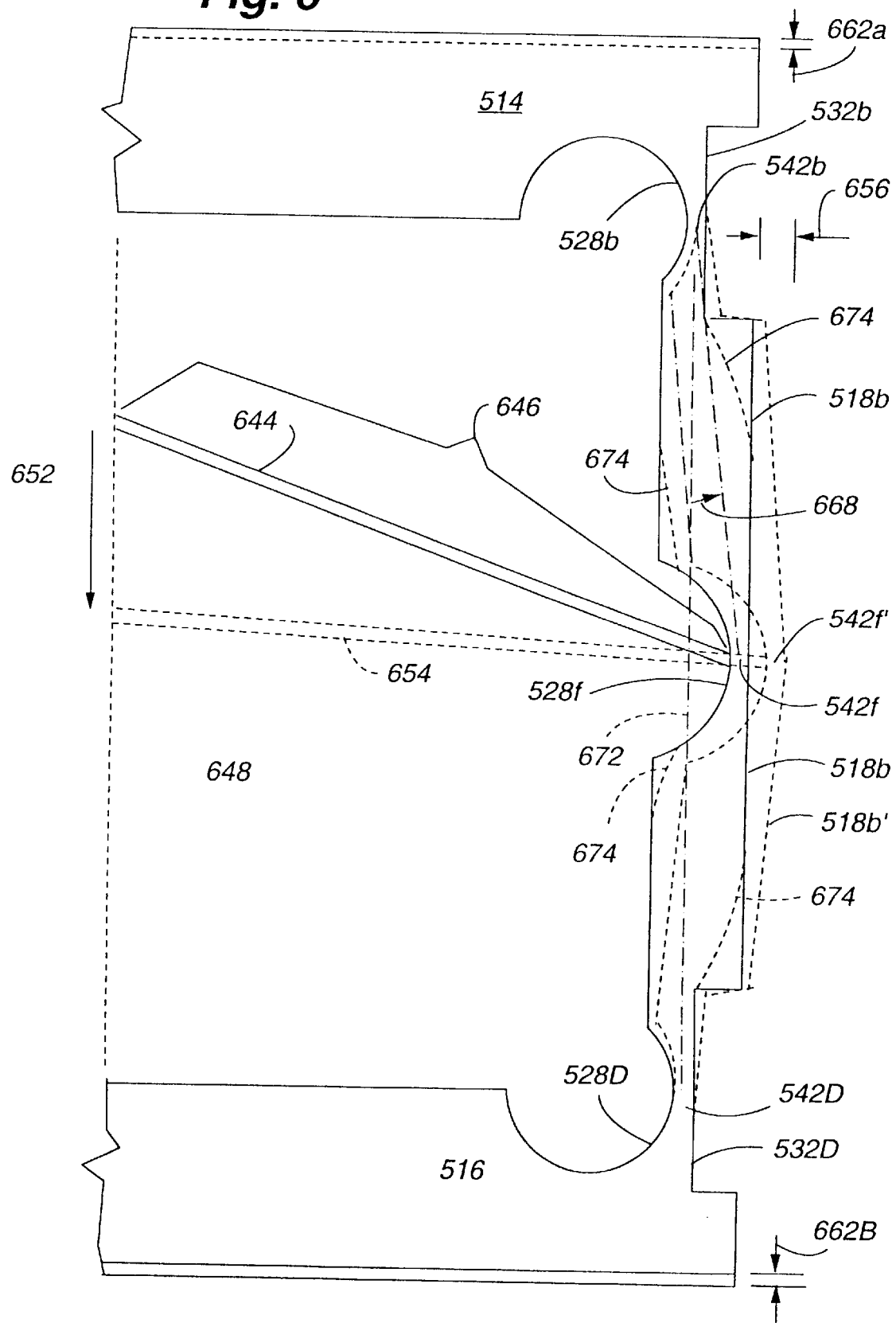
FIG. 6 is a schematic cross-sectional view of a flexure structure according an embodiment of the present invention.

As depicted in FIG. 6, an upwardly-deflected member 644 defines a first distance 646 from the center line 648. It is also possible to configure the device such that the member 646 maybe deflected downward (i.e. toward the lower wall) from a line joining the intermediate flexures. In the depicted embodiments, if the actuator 546 is activated to move the center portion of the member 644 downward 652, member 644 in the new position 654 will cause a deflecting outward force on the sidewall 518b causing the sidewall 518b to deflect a distance 656 outward at its midpoint (exaggerated, in FIG. 6, for clarity) with the sidewall 518b, as a result, flexing at the flexure axes 542b, 542d, 542f. A symmetric deflection and flexure occurs in the left sidewall. Outward deflection of the sidewall 518a, 518b causes the upper and lower walls 514, 516 to move towards each other by a distance 662a plus 662b, which is less than the distance 652 traveled by the actuator, thus achieving the motion reduction desired.

The magnitude of the reduction ratio will depend upon a number of factors. Although it is possible to provide various systems for adjusting the distance 548 between the intermediate flexure axes 542e, 542f the particular geometry of the depicted system, (viz. the deflectable member 644) will have an effect since, as depicted in FIG. 6, this geometry will define the ratio of change in distance 548 with respect to movement or displacement 652 of the actuator 546. The magnitude of the overall reduction ratio will also depend, in the depicted configuration, upon the size of the angle 668 defined by the intermediate flexure access 542f with respect to an imaginary line 672 joining the upper and lower flexure axes 542b, 542d, as shown in FIG. 6. In one embodiment, the angle 668 is between about 5° and about 15°, preferably about 10°. Since the location of the flexure axes 542b, 542f, 542d is determined by the curvlinear recesses 528b, 528d, 528f and the relief regions 532b, 532d, the position of these features may be selected to provide the desired angle 668 e.g. so as to achieve, in combination with other factors, a desired reduction ratio. The size and location of the flexure axis-defining features 528b, 528d 528f, 532b, 532d will also affect the local resistance to bending, ie. the suceptibiliy to flexure. For example, if it is desired to increase the tendency or susceptibility of the upper flexure 542b to bending or flexing, since the susceptibility to flexing is, in general increased by creating a thinner sidewall region in the vicinity of the flexure 542b, additional machining of the relief region 532b to further thin the sidewall in the vicinity of region 542b would have the effect of increasing the susceptibility or tendency towards bending flexing at the flexure 542b. Thus, the local sidewall thickness in the region of various flexures 542b, 542, 542f may be selected or adjusted e.g. to achieve a balance between the desired strength of the flexure assembly and the tendency or susceptibility to bending or flexing (which in turn affects the amount of force needed to achieve a given displacement). Preferably such reprofiling substantially preserves the ability of the flexure to avoid bending at points distant from the flexure axes. The present invention is thus preferably rigid in all axes.

Although the flexure structure has been depicted as defining substantially rectilinear or planar edges or surfaces (other than the round, elliptical or otherwise curved recess regions), other shapes or configurations are possible. In particular, it may be useful to provide other profiles such as those depicted in FIG. 6 in phantom lines 674 e.g. to reduce the total mass or size of the structure.

Figure 7:
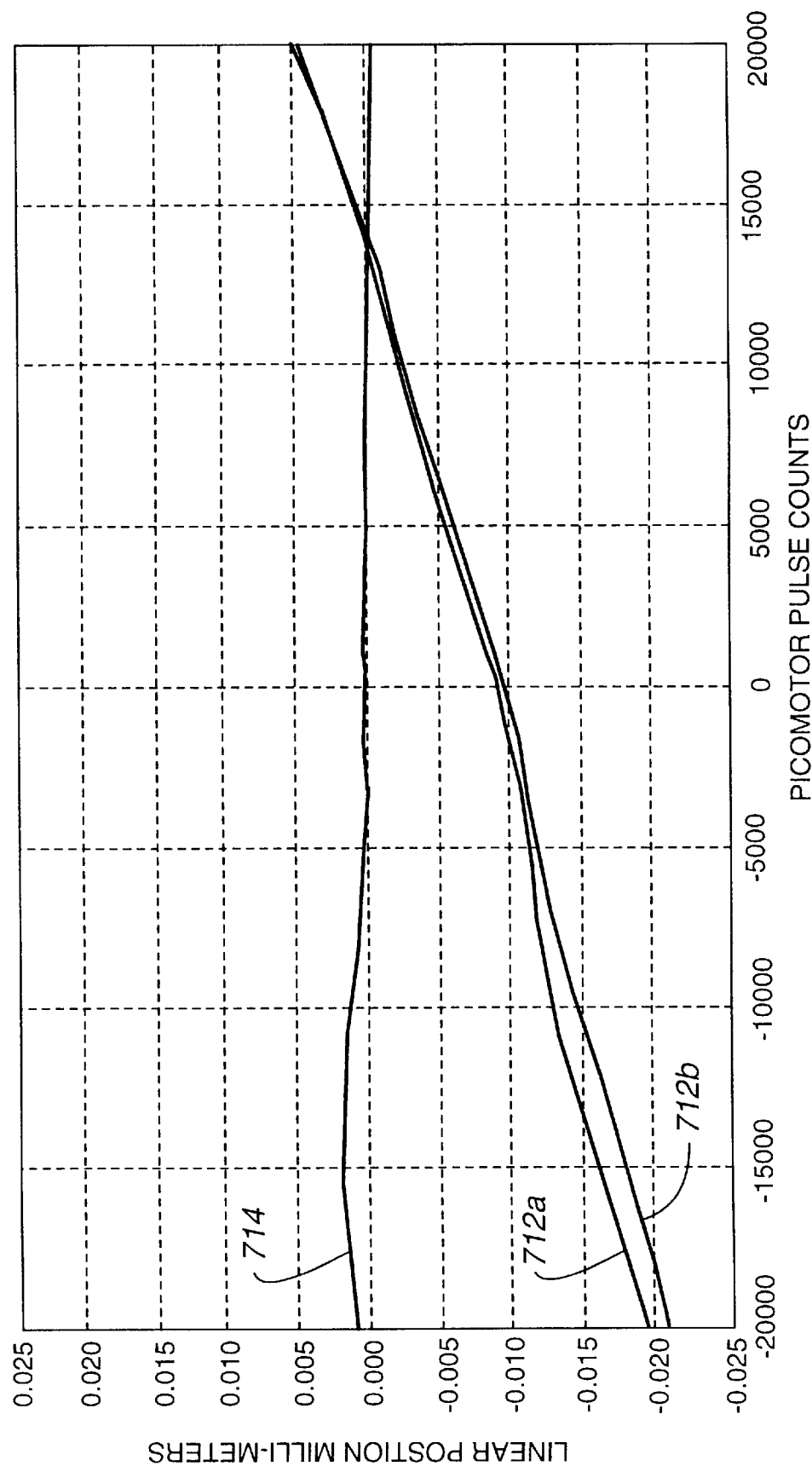
FIG. 7 is a graph depicting linear position resulting from the range of actuator motor steps provided by a device according to an embodiment of the present invention.

FIG. 7 depicts results of testing a device generally constructed according to FIGS. 3–5. In the depiction of FIG. 7, the Y-axis values indicate the amount of displacement, in millimeters, of the top surface of the flexure structure with respect to the bottom surface as a function of the number of actuator (e.g. picomotor) pulse or step counts (+/− with respect to a reference position). In this test, each actuator step or pulse corresponded to an actuator displacement of about 9 nanometers. The relatively constant slope of the resulting plots 712a, 712b representing, respectively, clockwise motor rotation and counterclockwise motor rotation, shows a substantially constant reduction ratio throughout the range of (output) motion in the test (approximately 0.025 mm). The difference between clockwise and counterclockwise rotation curves demonstrates relatively low hysteresis 714 with respect to this factor.

Figure 8:
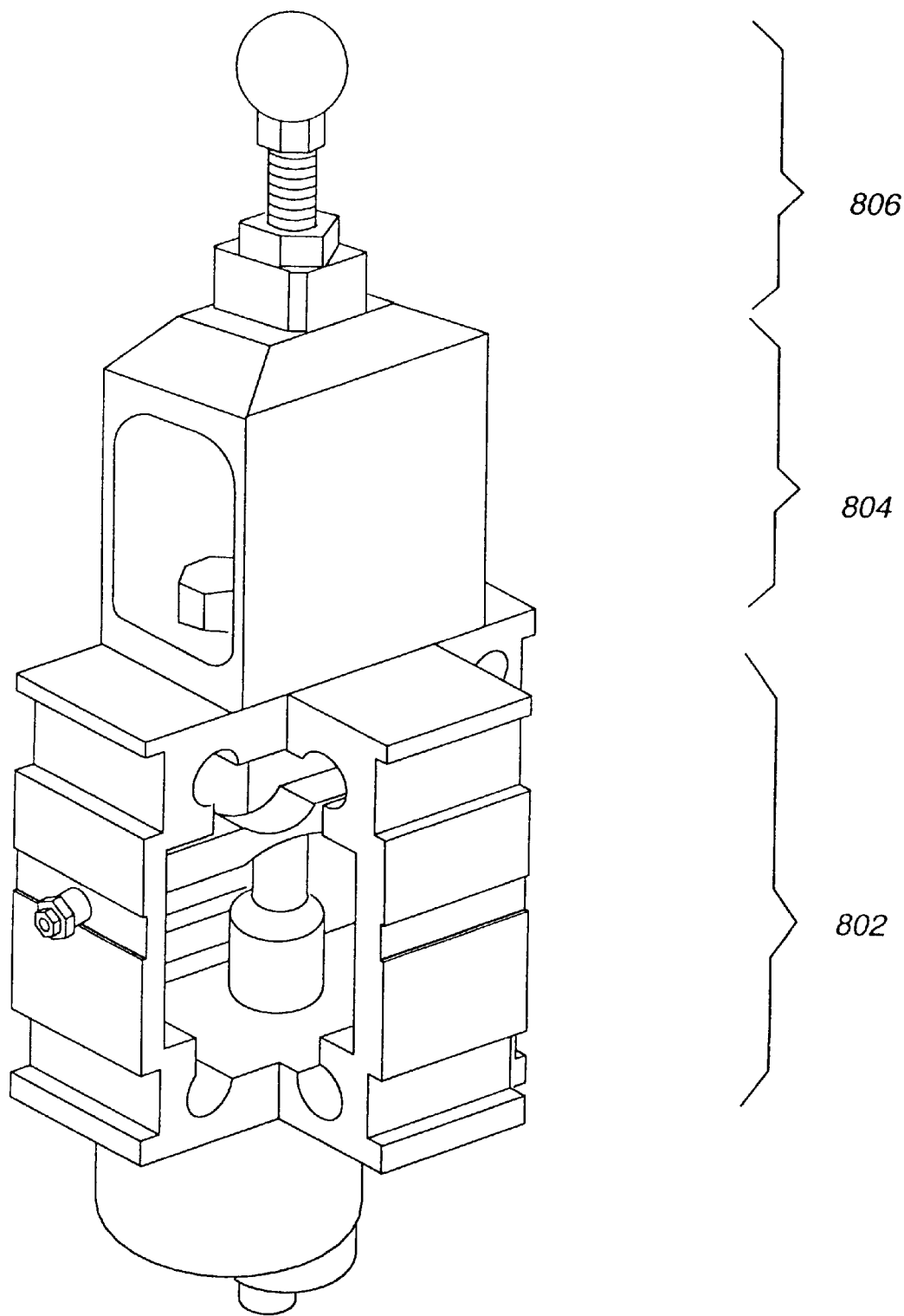
FIG. 8 is a perspective view of an actuator/flexure device with a mirror mount structure according to an embodiment of the present invention.

FIG. 8 depicts an actuator/flexure assembly similar to that depicted in FIG. 2 but in which the main flexure structure 802 is coupled to an upper structure 804 for adjustably mounting a ball mount 806 for coupling to a mirror. In the depicted embodiment, the ball mount 806 is adjustably coupled to permit relatively coarse adjustment. In the embodiment depicted in FIG. 8, the upper structure may be configured to provide an amount of lateral flexure e.g. to accommodate thermal (expansion and contraction) movements.

Figure 9:
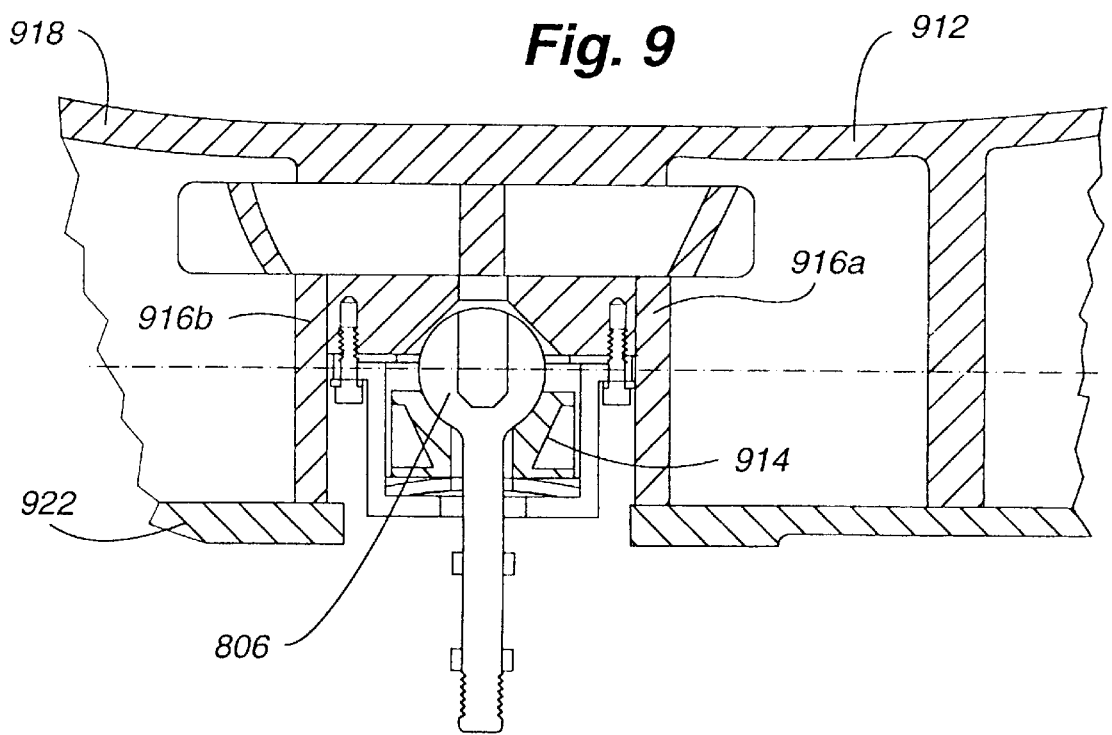
FIG. 9 is a cross section depicting one manner of coupling a mirror mount structure to a mirror segment.

FIG. 9 depicts one manner of coupling the ball mount 806 to a telescope mirror segment 912 via a conical race 914 mounted to mirror ribs 916a, 916b which couple the mirror face sheet 918 to a mirror back sheet 922.

Figure 10:
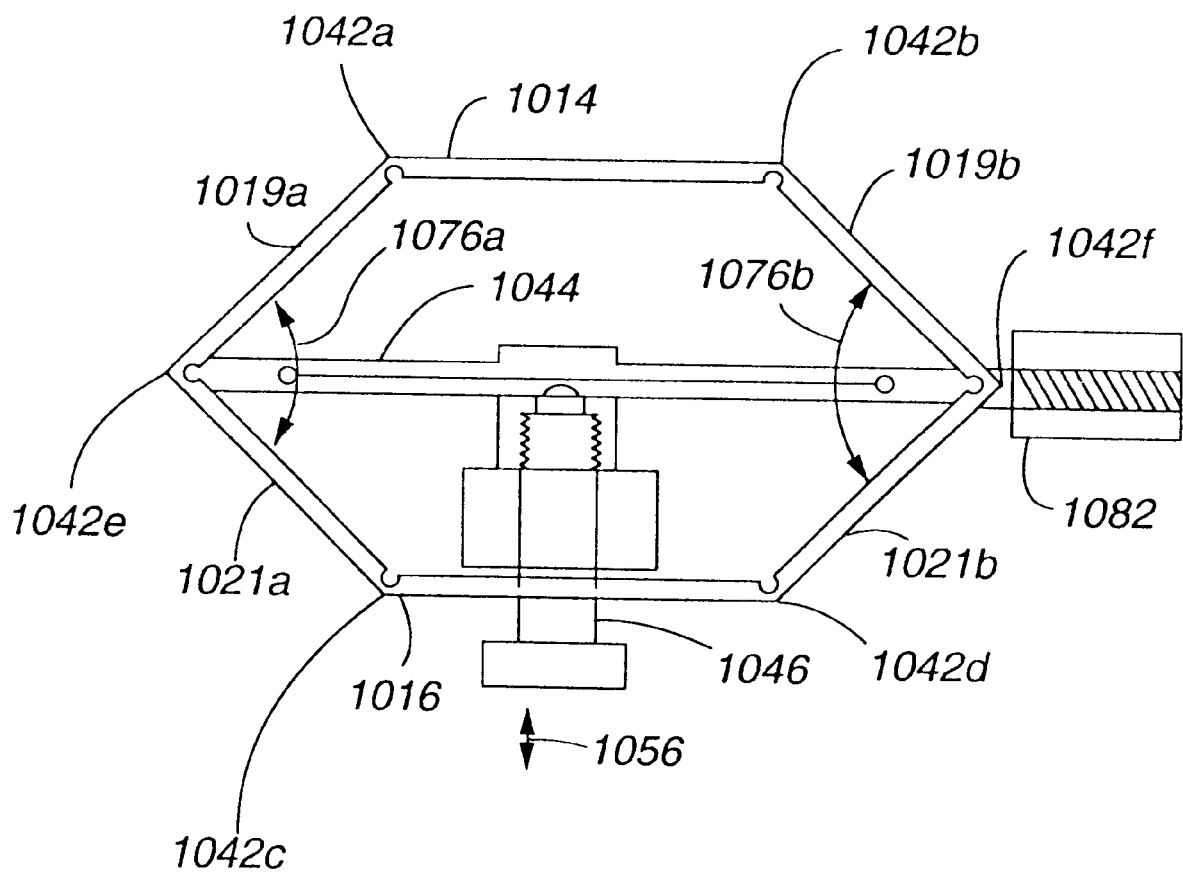
FIG. 10 is a schematic side view of a flexure/actuator device including coarse adjustment according to an embodiment of the present invention.

FIG. 10 depicts a configuration providing for relatively coarse, as well as fine, adjustment of displacement in the distance between the upper wall 1014 and lower wall 1016. In the configuration of FIG. 10, fine adjustment is achieved in a fashion similar to that described above in connection with FIGS. 3–6. In particular, longitudinal movement 1056 of actuator 1046 results in deflection of member 1044 which, owing to flexures 542a through 1042f, adjusts the distance between intermediate flexures 1042e, 1042f, in turn affecting the angles 1076a, b defined by the upper 1019a, 1019b and lower 1021a, 1021b portions of the left and right sidewalls to raise or lower the upper wall 1014 with respect to the lower wall 1016. Coarse adjustment, in the embodiment of FIG. 10, can be achieved by using the screw-threaded coupling 1082, rotatably coupled to an extension of the member 1044, to change the distance between intermediate flexures 1042e, 1042f with relatively coarse resolution.

Figure 11:
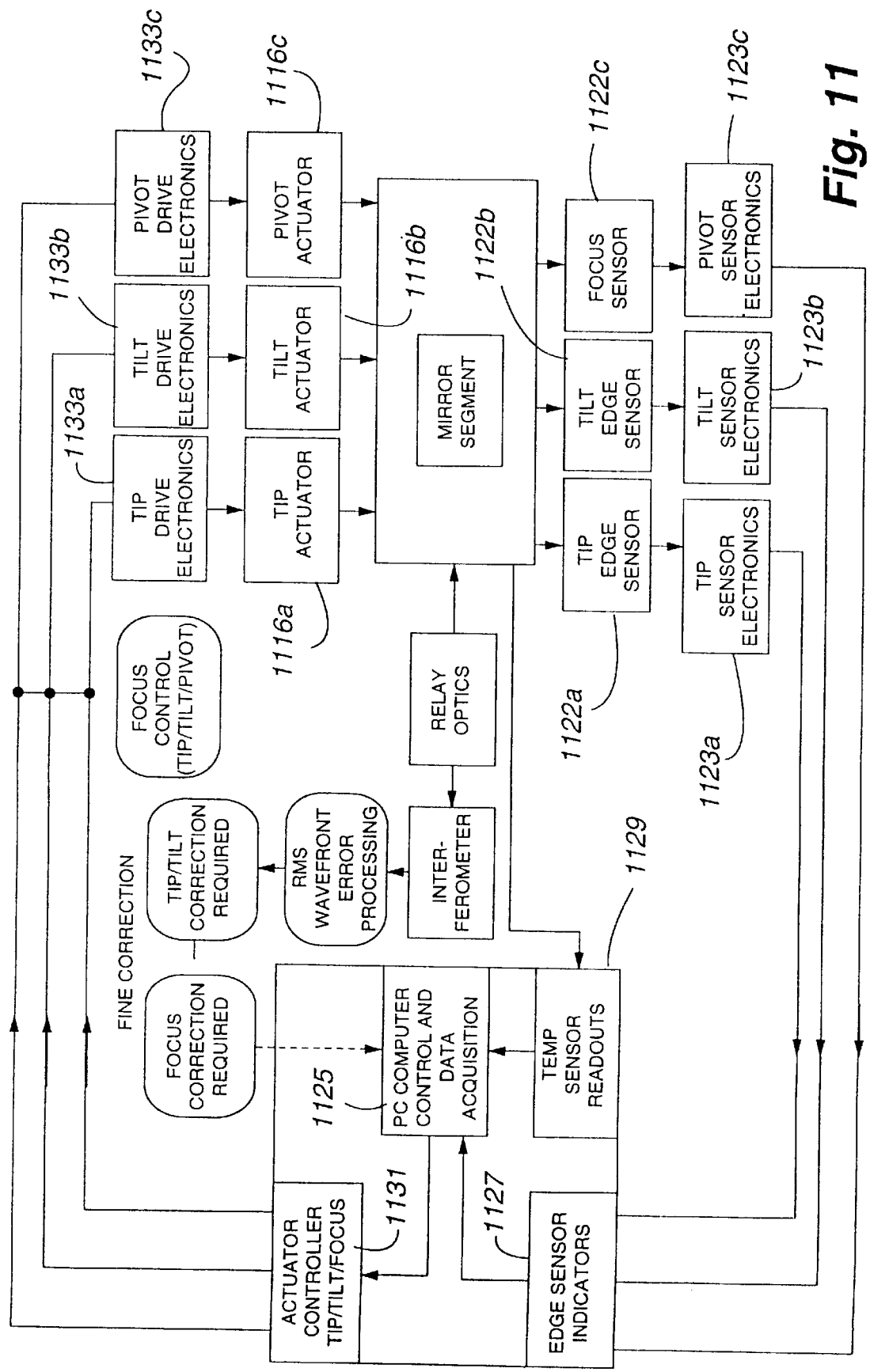
FIG. 11 is a block diagram depicting components of a space telescope using actuators for adjustment according to an embodiment of the present invention.

Preferably, adjustment of mirror segments is achieved by remote and/or automatic control, e.g. using a feedback loop employing data from edge sensors 1122a, 1122b and, where appropriate, focus sensor 1122c, as depicted in FIG. 11. Coupled electronics 1123a, b, c provide data to a computer 1125 via edge sensor indicators 1127. The computer, using other data as needed, such as temperature sensor data 1129, provides signals to actuator controller 1131 for outputting control signals to drive electronics 1133a, b, c for driving actuators 1116a, b, c.

In light of the above description, a number of advantages of the present invention can be seen. The present invention is able to achieve relatively high-resolution (fine) positional adjustment in response to (lower resolution) actuator movement throughout a relatively wide range of movement or displacement. By providing a sufficiently high reduction ratio, it may be possible to use a relatively coarser resolution (and thus less expensive) actuator than otherwise used. The present invention provides a single assembly or structure which achieves both actuator (adjustment) and mirror support functions preferably providing substantial strength and stability in all axes and preferably is able to provide support while withstanding launch forces. In one embodiment the actuator/flexure can support a relatively high mass mirror segment such as a mirror segment having a mass of about 10 pounds (about 4 kilograms) even under launch conditions involving relatively high accelerations such as 9 to 10 times gravitational acceleration or more. By providing a flexure or actuator/flexure structure capable of substantially supporting a mirror segment, and capable of withstanding launch forces, it may be possible to avoid the need for a launch snubber and thus decrease payload weight. The present invention is able to operate reliably at cryogenic temperatures as well as non-cryogenic (such as "room" temperature). The flexure/actuator can be provided with relatively low mass or size such as to facilitate launch of a space-based telescope. Although the present invention has been described particularly in connection with a space-based telescope, other technical or scientific instruments may benefit from application of the present invention including ground based, airborne or other telescopes, interferometers and the like. Although the present invention has been described in connection with mirror segment positioning, the present invention may be applied for additional purposes such as adaptive optics, including optics used for compensating for gravitational effects during telescope mirror positioning or tracking.

A number of variations and modifications of the invention can be used. Although in the depicted embodiment, upper and lower walls are maintained parallel, in other applications it may be desirable to move the upper wall through an angle with respect to the lower wall. Although the depicted configuration shows three actuators coupled to a mirror segment e.g. for mirror segment positioning, more or fewer actuators can be used, such as by coupling a fourth actuator for affecting mirror curvature. Although a particular ball mount apparatus has been depicted, other devices for coupling the actuator/flexure to a controlled object can be used.

Although the invention has been described by way of a preferred embodiment and certain variations and modifications, other variations and modifications can also be used in the invention being defined by the following claims.

What is claimed is:

1. A flexure structure for providing a reduction ratio between motion of an output end of an actuator and motion of a controlled object, comprising:
   a left sidewall having a depth, a thickness, and having upper and lower edges
   a right sidewall having a depth, a thickness and having an upper edge, coupled to said left sidewall upper edge by an upper wall and having a lower edge, coupled to said left sidewall upper edge by a lower wall;
   said left sidewall having a left upper, left intermediate and left lower thinned portions with a left upper, intermediate and lower portion thicknesses less than said left sidewall thickness;
   said left intermediate thinned portion defining a left sidewall upper portion, situated between said left intermediate thinned portion and said left sidewall upper edge, and a left sidewall lower portion, situated between said left intermediate thinned portion and said left sidewall lower edge;
   said left sidewall upper and lower portions being movable with respect to each other and with respect to said upper and lower walls by flexing about said left upper, left intermediate and left lower thinned portions defining left upper, left intermediate and left lower flexure axes;
   said right sidewall having a right upper, right intermediate and right lower thinned portions with a right upper, intermediate and lower portion thicknesses less than said right sidewall thickness;
   said right intermediate thinned portion defining a right sidewall upper portion, situated between said right intermediate thinned portion and said right sidewall upper edge, and a right sidewall lower portion, situated between said right intermediate thinned portion and said right sidewall lower edge;
   said right sidewall upper and lower portions being movable with respect to each other and with respect to said upper and lower walls by flexing about said right upper, right intermediate and right lower thinned portions defining right upper, right intermediate and right lower flexure axes;
   a linkage coupled to said left and right intermediate thinned portions and coupled to said actuator wherein, upon activation of said actuator to move the output end of said acutator a first distance, the distance between said left and right intermediate thinned portions is changed, and said upper wall moves, with respect to said lower wall, a distance which, at least within a fine-adjustment range of motion of said upper wall, is less than said first distance.

2. A flexure structure, as claimed in claim 1, wherein said left sidewall, said right sidewall, said upper wall and said lower wall are a single integral piece without joints therebetween.

3. A flexure structure, as claimed in claim 1, wherein at least one of said thinned portions defines a substantially curved profile.

4. A flexure structure, as claimed in claim 1 configured to operate at cryogenic temperatures.

5. A flexure structure, as claimed in claim 2 wherein said single integral piece comprises titanium.

6. A flexure structure, as claimed in claim 1 wherein said linkage comprises a deflectable plate coupled to said left and right intermediate thinned portions.

7. A flexure structure, as claimed in claim 6 wherein movement of said acutator changes the amount of deflection of said deflectable plate.

8. A flexure structure, as claimed in claim 1, wherein said acutator is coupled so as to move in a direction substantially parallel to said movement of said upper wall with respect to said lower wall.

9. A flexure structure, as claimed in claim 1 wherein said coupling of said linkage to at least one of said left and right intermediate thinned portions is adjustable to adjust the distance between said left and right intermediate flexure axes.

10. A flexure structure, as claimed in claim 1, wherein said reduction ratio is at least about 10:1.

11. A flexure structure, as claimed in claim 1 wherein said fine-adjustment range of motion is at least ±0.5 mm.

12. A flexure structure, as claimed in claim 1, wherein said fine-adjustment range of motion is at least about ±1.5 mm.

13. A flexure structure, as claimed in claim 1, further comprising front and rear deflectable walls coupling said upper and lower walls.

14. A flexure structure, as claimed in claim 1, wherein said controlled object comprises at least a portion of a telescope mirror.

15. A flexure structure, as claimed in claim 1, wherein said reduction ratio is substantially constant throughout said range of motion.

16. In a space-based telescope having a plurality of mirror segments, the improvement comprising:
   first, second and third flexure structures coupling first, second and third actuators to each of said plurality of mirror segments for adjusting tilt, tip and pivot of said plurality of mirror segments;
   each flexure structure having a reduction member including an upper wall, a lower wall and left, right, front and rear sidewalls coupling said upper and lower walls, each sidewall movably coupled to said upper wall at a flexure joint defining upper flexure axes and coupled to said lower wall at a flexure joint defining lower flexure axes, and each sidewall having an intermediate flexure joint to accommodate movement of said upper wall with respect to said lower wall;

a linkage configured to change the distance between the intermediate flexure joints of said left and right sidewalls in response to movement of an acutator.

17. A flexure structure for providing a reduction ratio between motion of an output end of an acutator and motion of a controlled object, comprising:

a left sidewall having a depth, a thickness, and having upper and lower edges a right sidewall having a depth, a thickness and having an upper edge, coupled to said left sidewall upper edge by an upper wall and having a lower edge, coupled to said left sidewall upper edge by a lower wall;

said left sidewall having a left upper, left intermediate and left lower flexures;

said left intermediate flexure defining a left sidewall upper portion, situated between said left intermediate flexure and said left sidewall upper edge, and a left sidewall lower portion, situated between said left intermediate flexure and said left sidewall lower edge;

said left sidewall upper and lower portions being movable with respect to each other and with respect to said upper and lower walls by flexing about said left upper, left intermediate and left lower flexures defining left upper, left intermediate and left lower flexure axes;

said right sidewall having a right upper, right intermediate and right lower flexures;

said right intermediate flexure defining a right sidewall upper portion, situated between said right intermediate flexure and said right sidewall upper edge, and a right sidewall lower portion, situated between said right intermediate flexure and said right sidewall lower edge;

said right sidewall upper and lower portions being movable with respect to each other and with respect to said upper and lower walls by flexing about said right upper, right intermediate and right lower flexures defining right upper, right intermediate and right lower flexure axes;

means coupled to said left and right intermediate flexures and coupled to said actuator for changing the distance between said left and right intermediate flexures, in response to moving the output end of said acutator a first distance, to move said upper wall, with respect to said lower wall, less than said first distance.

18. A method for moving a controlled object in response to motion of an acutator, the method comprising:

providing a flexure structure having a reduction member including an upper wall a lower wall and left, right, front and rear sidewalls coupling said upper and lower walls, each sidewall movably coupled to said upper wall at a flexure joint defining upper flexure axes and coupled to said lower wall at a flexure joint defining lower flexure axes, and each sidewall having an intermediate flexure joint to accommodate movement of said upper wall with respect to said lower wall;

coupling left and right intermediate flexure joints by a linkage coupled to said actuator; and moving said acutator a first distance, to cause said coupling to change the distance between said left and right intermediate flexure joints wherein said upper wall moves, with respect to said lower wall, a distance less than said first distance.

* * * * *